(No Model.)

C. W. SMITH.
SOIL PULVERIZING MACHINE.

No. 281,149. Patented July 10, 1883.

Witnesses.
Robert Everett.
Jos. L. Coombs

Inventor.
Charles W. Smith.
By Henry Millward
Atty.

UNITED STATES PATENT OFFICE.

CHARLES W. SMITH, OF SPRINGFIELD, OHIO.

SOIL-PULVERIZING MACHINE.

SPECIFICATION forming part of Letters Patent No. 281,149, dated July 10, 1883.

Application filed October 12, 1882. (No model.)

*To all whom it may concern:*

Be it known that I, CHARLES W. SMITH, of Springfield, county of Clarke, State of Ohio, have invented a new and useful Improvement in Soil-Pulverizing Machines, of which the following is a specification.

Figure 1:
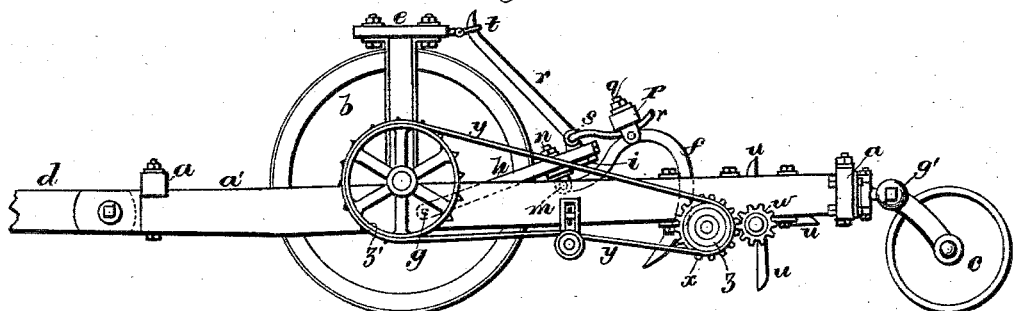
Figure 2:
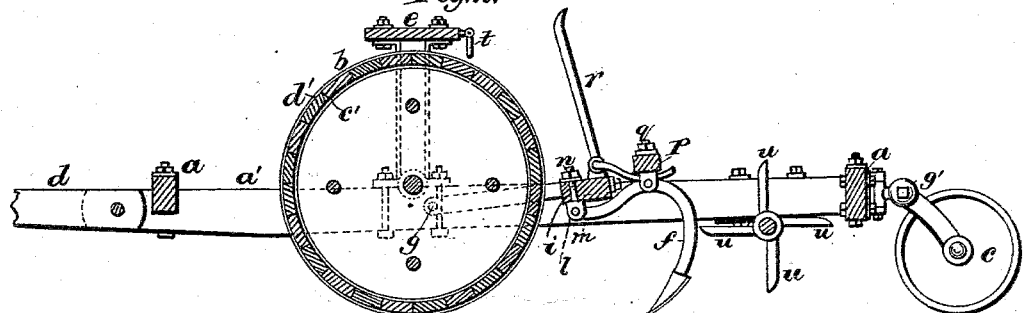
Figure 3:
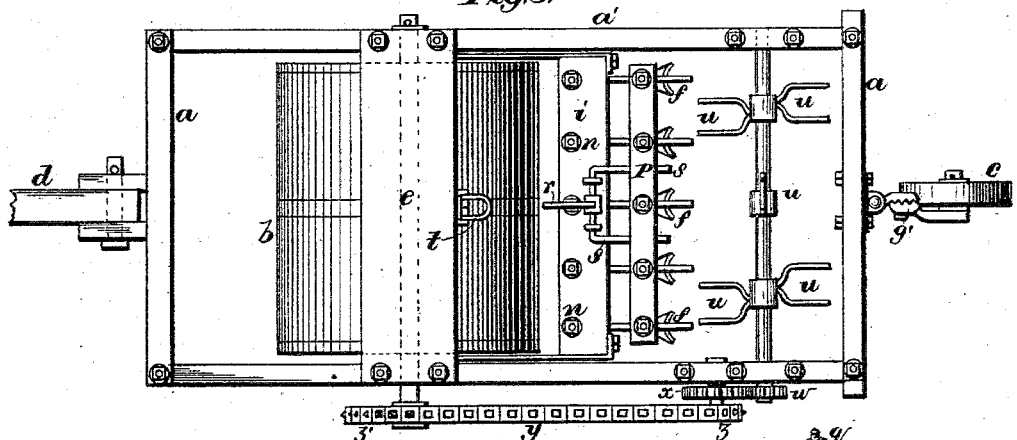
Figure 4:
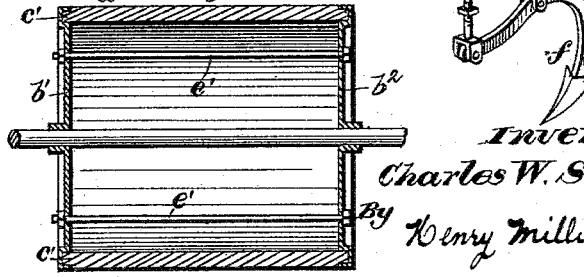

In the accompanying drawings, Figure 1 is a longitudinal elevation of a machine embodying my invention. Fig. 2 is a longitudinal sectional elevation. Fig. 3 is a plan view; and Fig. 4 a section through the axis of the crushing-roller, drawn to an enlarged scale to better represent its construction.

My invention relates to machines used for the purpose of manipulating the surface of the ground to render it smooth and in good condition for the subsequent operation of seeding.

My improvement consists in the combination and arrangement of the crushing-roller, gang-plows, and rotary cutters, as hereinafter described, and particularly pointed out in the claims.

In the accompanying drawings similar letters of reference represent corresponding parts in each of the figures.

To enable others skilled in the art to which my invention belongs to make and use the same, I will proceed to describe its construction and operation.

The rectangular frame $a\ a'$ is mounted upon a wide-faced crushing-roller, $b$, and a vertically-adjustable caster-wheel, $c$. The frame $a\ a'$ is provided with a pole or tongue, $d$, and a seat, $e$. A system of gang-plows, $f$, is pivoted to the longitudinal stringers at $g$ by means of straps $h\ h'$, that support a cross-piece, $i$, to which the said plows $f$ are pivoted at $l$ through the agency of jaws $m$ and bolts $n$. A cross-piece, $p$, joins the several plows $f$ by means of jaws and screw-bolts $q$, and thereby causes them to rise and fall together. The gravitating cross-piece $i$, swinging on the straps $h\ h'$, and the gravitating cross-piece $p$, swinging on the plows $f$ from the centers $l$, serve as weights to keep the plows $f$ to their work, and at the same time permit them to rise when in contact with an unusual obstruction, also to follow the undulations of the ground. The pins upon which the gang-plows swing, and also those upon which the straps $h\ h'$ swing, may be made of wood, if thought necessary. A bifurcated lever, $r$, pivoted at $s$ to the cross-piece $i$, passes underneath the cross-piece $p$, as clearly shown in the drawings, and is used to lift the plows $f$ from the ground and retain them in their elevated position by means of any suitable catch, $t$, secured to the seat $e$. It is obvious that some other kind of lifting-lever may answer just as well as the one shown—as, for example, a toothed sector in which works a spring-detent that forms a part of an ordinary lifting-lever. This lever may also be used to lift the plows $f$ to clear them from foreign matter that may accumulate in front of them. A number of rotating cutters, $u$, are mounted upon a shaft, $v$, that is driven by spur-gear $w\ x$, the spur-wheel $x$ being actuated by a chain, $y$, and sprocket-wheels $z\ z'$, the wheel $z'$ being fast to the shaft upon which the crushing-roller $b$ revolves, and the sprocket $z$ on the shaft of the spur-wheel $x$. The caster-wheel $c$ is provided with a joint, $g'$, having serrated contiguous faces held together by a screw-bolt, whereby it may be raised or lowered, as desired. The roller $b$ may be made with two metallic ends, $b'\ b^2$, having circumferential grooves $c'$, into which the staves $d'$ are inserted, and the whole drawn together by screw-bolts $e'\ e'$, so that they are capable of adjustment to compensate for shrinkage.

The operation of my improved machine may be briefly described as follows: As the machine is drawn over the ground, the crushing-roller $b$ acts to crush all clods in its path. Should it fail to do so completely, and in place thereof push some into the ground, the plows $f$ will root them up and leave them upon the surface of the ground for the rotating cutters $u$ to act upon and cut them into fragments.

Having thus described my invention, what I claim as new, and desire to secure by Letters Patent, is—

1. The combination, with the crushing-roller, of a set of gang-plows, $f$, located in rear of said roller, and the straps $h\ h'$, pivotally supported at one end, and at their opposite ends connected with a cross-piece, $i$, the gang-plows being hinged to the said cross-piece, and being connected with each other by the cross-piece $p$, substantially as described.

2. The combination, with the main frame $a\ a'$, supported by the crushing-roller and by a vertically-adjustable caster-wheel, of a set of gang-plows, $f$, rigidly connected together and hinged to a cross-bar, which is in turn connected with the main frame by supports pivoted to the latter, and a set of rotary cutters, $u$, located in rear of the gang-plows, said members being constructed and organized substantially as described.

In testimony whereof I have hereunto set my hand this 29th day of September, 1882.

C. W. SMITH.

Witnesses:
CHAS. M. KING,
H. A. ASHLEY.